United States Patent [19]
Watson

[11] 3,799,272
[45] Mar. 26, 1974

[54] SIX AND EIGHT ROW CULTIVATOR AND PLANTER FRAME
[76] Inventor: Douglas M. Watson, Box 513, Hawkinsville, Ga. 30643
[22] Filed: May 16, 1972
[21] Appl. No.: 253,799

[52] U.S. Cl.................. 172/126, 172/311, 172/611
[51] Int. Cl....................... A01b 17/00, A01b 73/00
[58] Field of Search .......... 172/126, 311, 439, 611, 172/776; 280/411 R, 411 A, 412, 413

[56] References Cited
UNITED STATES PATENTS

| 2,004,846 | 6/1935 | Allison et al.............. | 172/611 X |
| 2,124,466 | 7/1938 | Le Bleu .................... | 172/611 X |
| 2,641,886 | 6/1953 | Graham ..................... | 172/311 |
| 3,033,296 | 5/1962 | Kaufman et al. ........ | 172/311 X |
| 3,211,238 | 10/1965 | McClenny.................. | 172/776 X |
| 3,321,028 | 5/1967 | Groenke ................... | 172/311 |
| 3,414,064 | 12/1968 | Foster....................... | 172/311 |
| 3,435,546 | 4/1969 | Iverson ..................... | 172/611 X |
| 3,472,528 | 10/1969 | Richey et al............. | 172/439 X |
| 3,524,508 | 10/1970 | West......................... | 172/126 |

FOREIGN PATENTS OR APPLICATIONS
627,972   9/1961   Canada............................ 172/439

Primary Examiner—Robert E. Bagwill
Assistant Examiner—Paul T. Sewell
Attorney, Agent, or Firm—Watson, Cole, Grindle & Watson

[57] ABSTRACT

A rigid frame assembly including articulated central, enclosed box frame and outer enclosed box frame units capable of being raised into a vertical position relative to the central unit, and capable also of freely following the ground contour during travel of the assembly therealong. Each frame unit is capable of being filled with a fluid for increasing the weight along the assembly, and a three-point hitch arrangement is provided for enabling the assembly to be hydraulically lifted by a draft vehicle.

3 Claims, 3 Drawing Figures

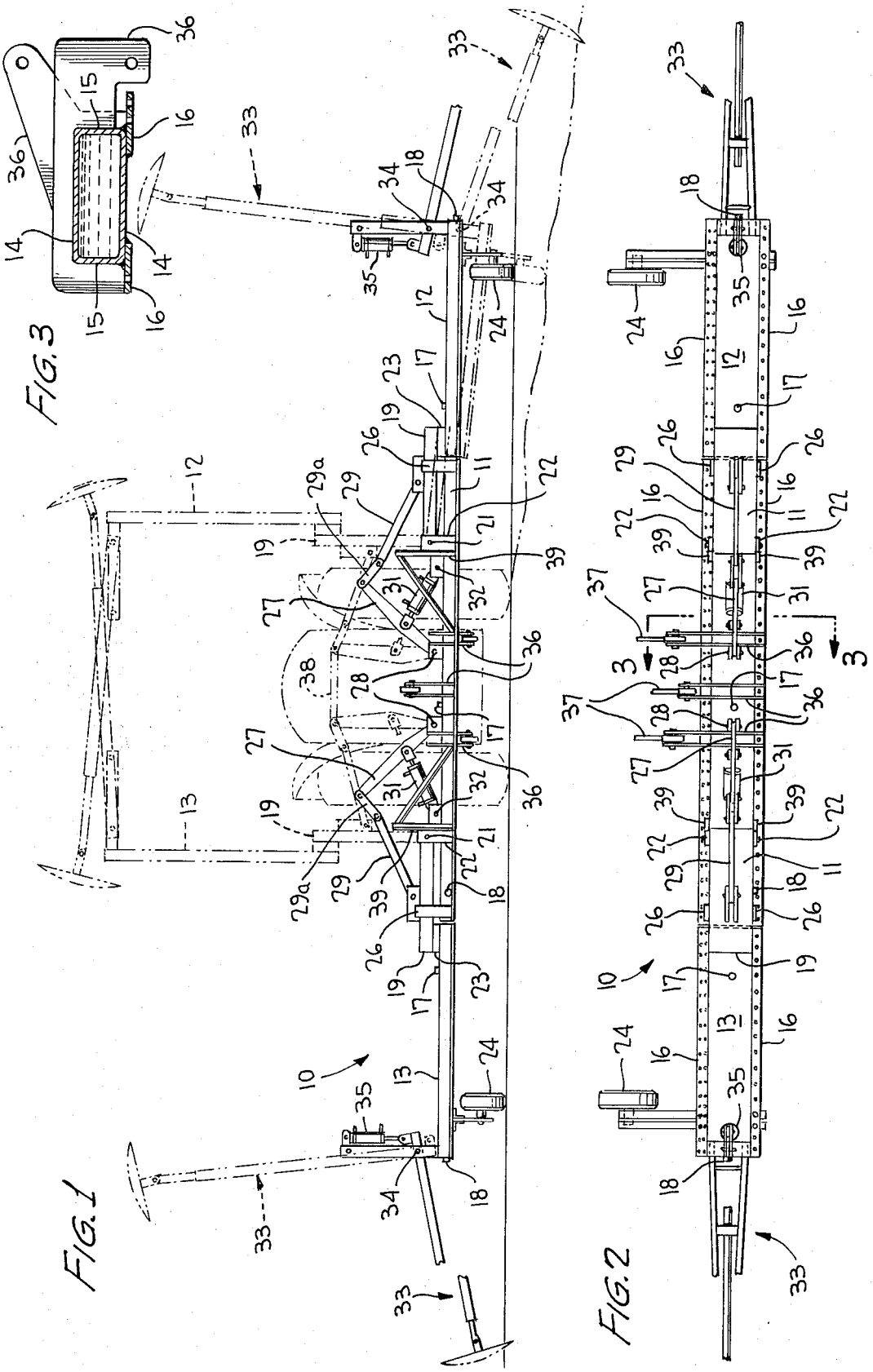

SIX AND EIGHT ROW CULTIVATOR AND PLANTER FRAME

This invention relates generally to a frame assembly and more particularly to such an assembly which is wide enough to accommodate six or eight rows for cultivating and planting yet is sufficiently rigid and weighted without the need for heavy and complex structures.

In order to increase the swath worked by earthworking implements while being pulled by a draft vehicle, multiple units for cultivating or multiple planter units are mounted along the length of an elongated frame assembly. Such a frame assembly is normally therefore constructed of heavy frame members which must be adequately braced to insure a structurally sound frame assembly of a length to accommodate all of the harrow units or planters mounted thereon. Transportation of these long frame assemblies on the open road, however, presents an immense traffic problem because movement of these assemblies not only obstructs traffic but it becomes quite unmanageable to guide the assembly about sharp turns in the road without exercising extreme and time-consuming care during the maneuvering of these devices. Also, it becomes quite difficult to maneuver these long frame assemblies in the field during, for example, entry of gate portals or while turning along a sharp radius. Depending on the size and shape of the area to be cultivated and planted, it normally becomes necessary to either overlap or omit certain of such areas during cultivating and planting due to the unmanageable size of the assembly. In addition, these elongated frame assemblies, even with their structural beams and bracings, are not sufficiently rigid so that it becomes impractical to mount large hoppers thereon for peanuts, for example, which hoppers are normally constructed of fiberglass or the like.

It is therefore a principal object of the present invention to provide a frame assembly for cultivators and planters which is structurally sound and sufficiently rigid without the need for heavy structural beams and complex bracings thereby also permitting portions of the assembly, which are articulated, to be raised during transport of the assembly on the open road and to be raised for easier maneuverability in the field without the need for heavy and complex equipment.

Another object of this invention is to provide such an assembly comprising articulated central and outer hollow frame units in the form of rectangular box beams which are light yet are structurally sound and rigid to accommodate any number of cultivator units and planter units and elongated hoppers while at the same time permitting the articulated frame units to be raised during transport without the need for heavy and complex structural means.

A further object of this invention is to provide such a frame assembly wherein filler and drain plugs are provided on each frame unit so they may be filled with a sufficient quantity of fluid for providing the necessary weight during planting and cultivating yet may be drained to an extent necessary either during transport of the assembly or during use in the field thereby significantly decreasing its weight for easier maneuverability.

A still further object of this invention is to provide such a frame assembly wherein outer beam units, interconnected with a central beam unit, are each provided with a wheel assembly at their outer ends and are each capable of following the contour of the ground during planting and cultivating.

A still further object of the present invention is to provide such a frame assembly wherein a three-point hitch arrangement is mounted on the central frame unit wherein each hitch point is constituted by a pair of spaced hitch plates offering improved rigidity and stability for the hitch connection.

Other objects, advantages and novel features of the invention will become apparent from the following detailed description of the invention when considered in conjunction with the accompanying drawings wherein:

FIG. 1 is a rear elevational view of the frame assembly constructed in accordance with the present invention;

FIG. 2 is a top plan view of the assembly of FIG. 1; and

FIG. 3 is a cross-sectional view through the assembly taken along the line 3—3 of FIG. 2.

Turning now to the drawings wherein like reference characters refer to like and corresponding parts throughout the several views, a frame assembly generally designated 10 is shown as comprising substantially a central frame unit 11 and interconnected outer frame units 12, 13. Each of these frame units is constructed as hollow rectangular box beams having spaced horizontal walls 14 interconnected with space vertical walls 15.

FIG. 3 shows a typical section for each of the central and outer frame units wherein it can be also seen that horizontal flange plates 16, extending outwardly of each vertical wall 15, are secured in place as by welding to the bottom wall 14. Moreover, each of the central and outer frame units is provided with a filler plug 17 in the top horizontal wall 14 as well as drain plugs 18 in either one of the side walls 15 or in the end walls of the outer frame units as shown. In such manner, each frame unit may be independently filled with a fluid such as water in some desired amount for providing additional weight for each frame unit and, by means of drain plugs 18, each frame unit may be drained to the extent necessary.

Each of the outer frame units 12, 13 is interconnected near one end of the central frame unit by means of a rigid connecting plate 19 secured as by welding at one end to the top wall 14 at the inner end of an outer frame unit. The opposite end of connecting plate 19 is pivotally secured as at 21 to a pair of spaced hinge plates 22. A spacer element 23 is located between this one end of each connecting plate 19 and the top wall 14 of the interconnected outer frame unit. By such an arrangement, pivot point 21 is elevated a slight distance from top wall 14 of the central frame unit thereby permitting each outer frame unit to pivot downwardly, as shown in phantom in FIG. 1, as its wheel 24, which is mounted near the outer end of each outer frame unit, rolls along and follows the contour of the ground behind the draft vehicle 25. Guide plates 26 are provided for connecting plate 19 so as to insure a proper alignment between the outer frame units and the central frame unit during up and down movement of the outer frame units.

It should be noted that the various units for cultivating and the various planting units are mounted along the central and outer frame units along the openings (not referenced) provided in flange plates 16 although none of these earthworking implements are shown in the drawings in the interest of clarity. Also, an elongated hopper may be mounted along the assembly through these openings in the flange plates 16 although in such hopper, too, is not shown in the drawings.

Each of the outer frame units is capable of being elevated to a vertical position, as shown by phantom in FIG. 1, by means of a simple linkage and hydraulic actuator arrangement. A first linkage bar 27 is provided for raising each outer frame unit 12, 13 and is pivotally secured to the central frame unit as at 28, with a pair of second interconnected linkage bars 29, 29a linking the other end of each bar 27 with connecting plate 19. A hydraulic actuator unit 31 is pivotally secured at one end to each bar 27 between its ends, and at its other end each actuator unit 31 is pivotally secured as at 32 to central frame unit. Accordingly, upon extension of each piston rod out of each actuator unit 31, each linkage rod 27 will be moved to a vertical position as shown in phantom in FIG. 1 thereby raising each outer frame unit through linkage bars 29, 29a and connecting plates 19. Each of these actuator units 31 is hydraulically operated independently of one another from a source (not shown) so that the outer frame units 12 may be raised and lowered independently of outer frame unit 13.

When the outer frame units are in a horizontal position, the plungers of hydraulic actuators 31 are fully retracted as shown in FIG. 1. The weight of the outer units is supported by wheels 24 and, by reason of the split linkage 29 and 29a, each outer frame unit may pivot upwardly and downwardly about its respective pivot point 21. By reason of its length, the split linkage 29, 29a permits the outer frame unit to pivot downwardly and will also facilitate upward pivotal movement without movement of linkage bars 27 and actuators 31.

Row marker means 33 are hingedly secured as at 34 at the outer end of each outer frame unit and are capable of being raised and lowered about hinge 34 to a position shown in phantom in FIG. 1 by means of an hydraulic actuator 35. Accordingly, rows may be conveniently marked along both the level ground as shown in FIG. 1 and along a sloping level as shown to the right in FIG. 1 since the row marker means 33 will also follow the ground contour, and may be elevated to lie perpendicular to its outer frame unit before being raised along with its outer frame unit during transport of the assembly.

In order to hitch the frame assembly to draft vehicle 25, three pair of spaced hitch plates 36 are mounted along the length of the central frame unit 11 in spaced relationship as shown. The outer hitch plate pairs each have an end extending downwardly, as shown in FIG. 3, and the central hitch plate pair have an end extending forwardly. Each hitch plate pair extends about three sides of the frame 13 and the hitch bars 37 are conveniently located at one end between each hitch plate pair as shown in FIGS. 1 and 2. Also, each hitch plate pair is mounted to the central frame unit as by welding along three sides thereof. The three point hitch connection is therefore more rigid and more stable as compared to most prior art designs.

Also, it should be noted that a lock bar 38 is provided for each outer frame unit. Bar 38 is hinged at one end to one of the bars 27 and is locked in place at its other end over a link pin of the other linkage bar 27. Stop members 39 are disposed inwardly of hinge plates 22 so that connector plates 19 for each of the outer frame units may rest thereagainst when the outer frame units are elevated into their vertical position as shown in FIG. 1. The lock bar 38 is shown locked in place in FIG. 1 and, being located at the free ends of bars 27, offer stability for the locked elevated outer units while elevated.

From the foregoing, it can be seen that a frame assembly for accommodating multiple cultivator units and planters has been devised in a simple and highly economical manner with the use of hollow box beams serving as frame units, the outer ones of which may be conveniently raised vertically into a travel position without the need for a complex actuator arrangement. The box beams may be conveniently filled with a fluid to provide the necessary weight for the earth-working implements and the fluid may be drained to the to the extent necessary during use. The need for heavy and complex structural elements for the frame assembly is therefore substantially avoided yet the frame units present such a rigid structure that flexing and bending thereof is held to a minimum. Elongated hoppers for peanuts, for example, may therefore be conveniently mounted along the frame units with very little likelihood of fracture or damage to the hopper which may be constructed of a plastic or fiberglass material. Moreover, each of the outer frame units are uniquely interconnected with the central frame units so as to be capable of following the ground contour while being pulled by the draft vehicle. The three-point hitch is also designed to add to the uniqueness and desirability of such a frame assembly in that it simply and effectively increases the stability for the hitch connection.

Obviously, many modifications and variations of the present invention are possible in the light of the above teachings. It is therefore to be understood that within the scope of the appended claims, the invention may be practiced otherwise than as specifically described.

What is claimed is:

1. A frame assembly for cultivating and planting equipment, comprising: a central, horizontal and elongated frame unit; a central forwardly extending hinge plate mounted on said frame, and an outer forwardly and downwardly extending hinge plate mounted on said frame spaced from opposite sides of said central plate so as to define a three-point hitch for the assembly; an outer, horizontal and elongated frame unit at opposite ends of said central frame unit; a rigid plate mounted at one end thereof on a spacer to the inner end of each said outer unit at the top thereof and extending over a portion of the top of said central unit, the end opposite said one end of each said rigid plate being spaced from the respective ends of said central unit and being pivotally connected to said central unit thereat; ground engaging wheel means at the outer end only of each said outer frame unit; means for independently raising each of said outer frame unit vertically upwardly about their respective pivotal connections, said raising means comprising a first bar hingedly connected at one end thereof to said central frame unit, a second bar unit pivotally connected at one end thereof to the opposite end of said first bar and being hingedly connected at its opposite end respectively to said rigid plates, hydraulic actuators mounted on said central frame unit and being connected to each said first bar for moving same about its one end and thereby moving said outer frame unit about their repective pivotal connections; each of said frame units comprising a rectangular, enclosed box frame having spaced, interconnected horizontal and vertical walls, and outwardly extending flanges secured to the bottom ones of said horizontal walls for supporting the cultivating and planting equipment on said frame units, plugged fluid filler openings on each said frame unit for filling them with fluid to thereby weight-down said frame units, and plugged fluid drain openings on each said frame unit for draining the fluid therefrom; said frame units capable of being together mounted to the rearward end of a draft vehicle solely by means of said hinge plates which also serve to fully support said frame units when said outer frame units are in an upwardly raised position, and whereby said outer frame units are capable of moving both upwardly and downwardly about their respective pivotal connections as their respective ground-engaging wheel means follows the contour of the ground during travel of the assembly.

2. The assembly according to claim 1 wherein row marker means are hingedly interconnected to each of said outer frame units at said outer ends thereof, and hydraulic actuators are provided for raising and lowering each of said marker means about their hinged connections.

3. The assembly according to claim 1 wherein vertically extending rod members are mounted on said central frame unit inwardly of the pivotal connection for each said outer frame unit thereby serving as a stop against which each said outer frame unit contacts in its raised vertical position.

* * * * *